No. 753,754. Patented March 1, 1904.

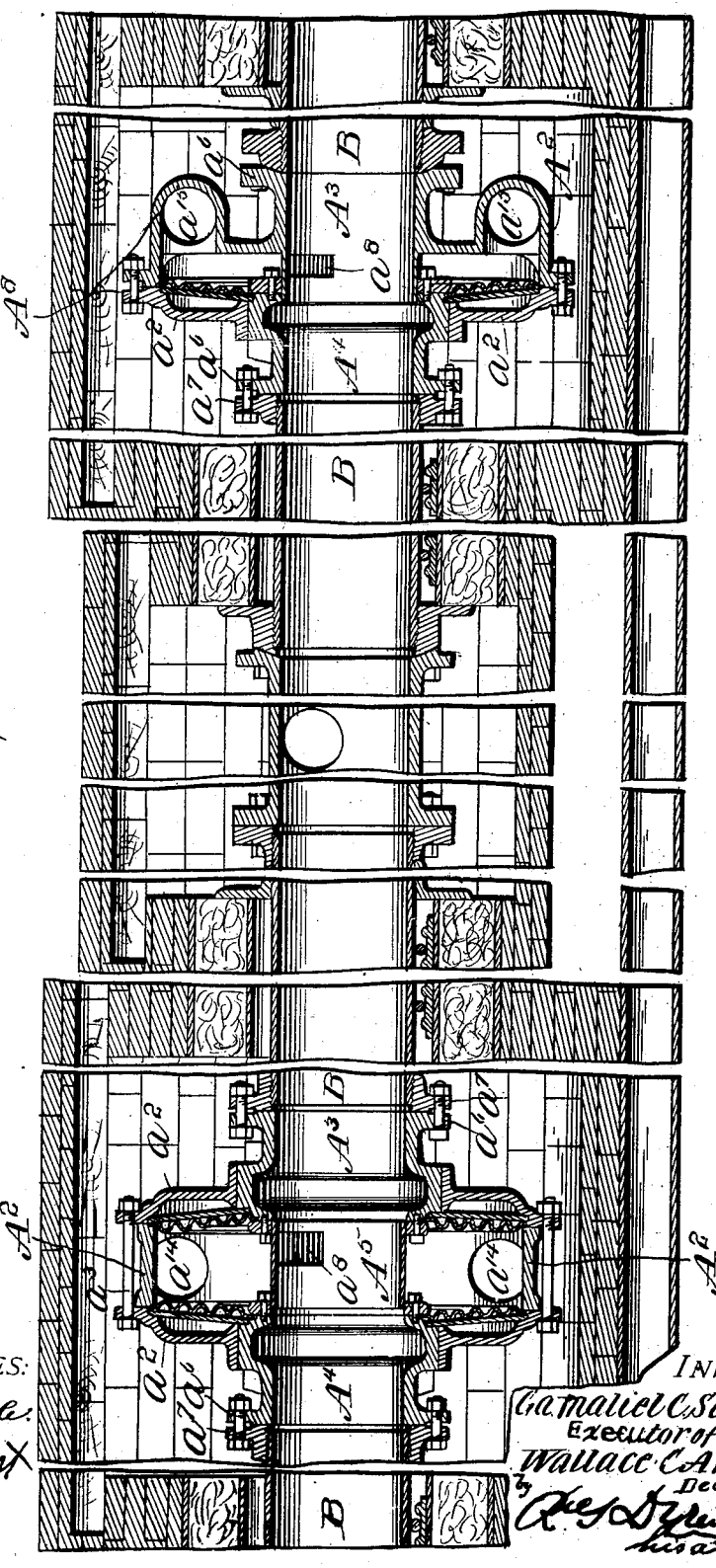

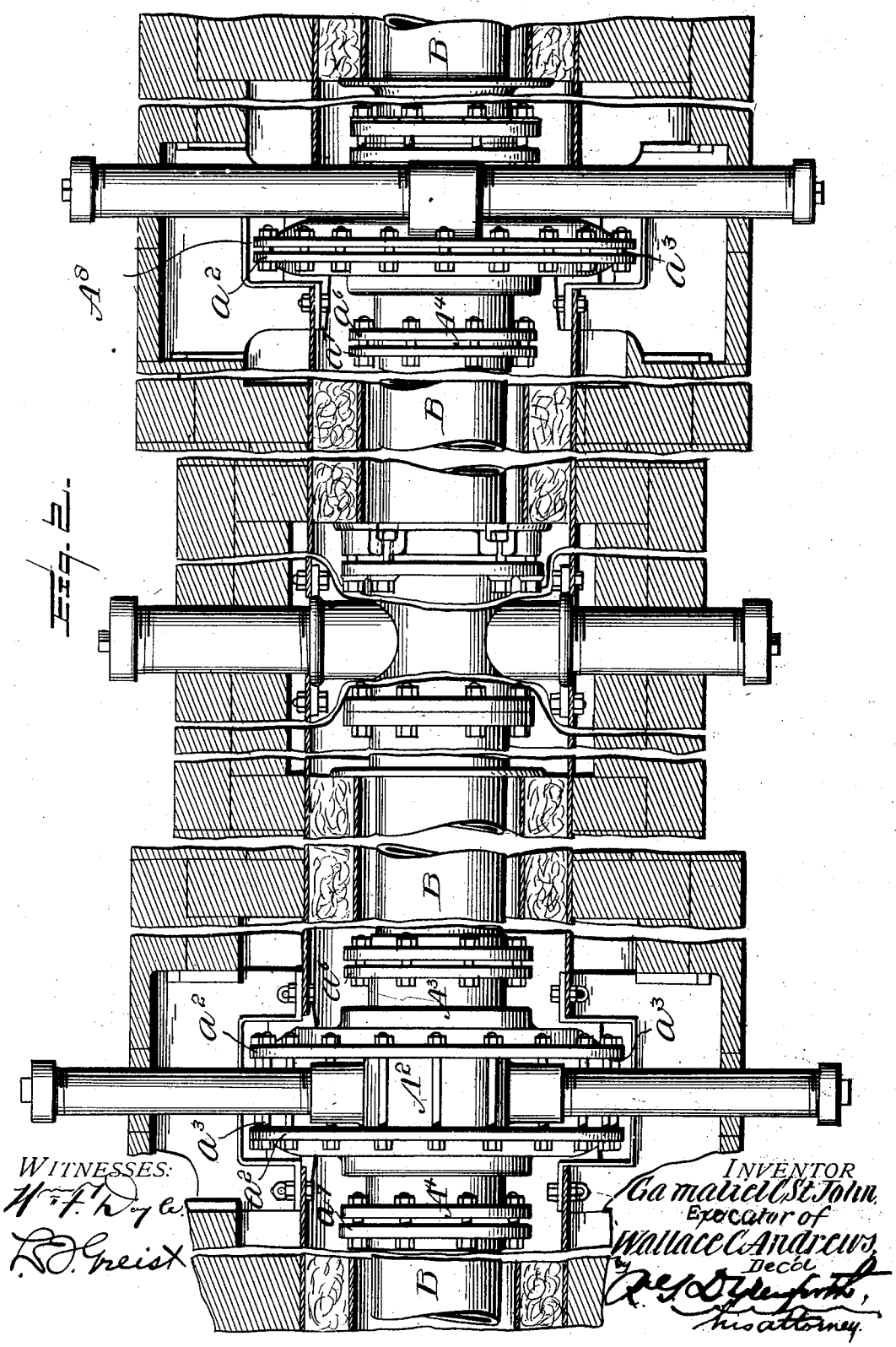

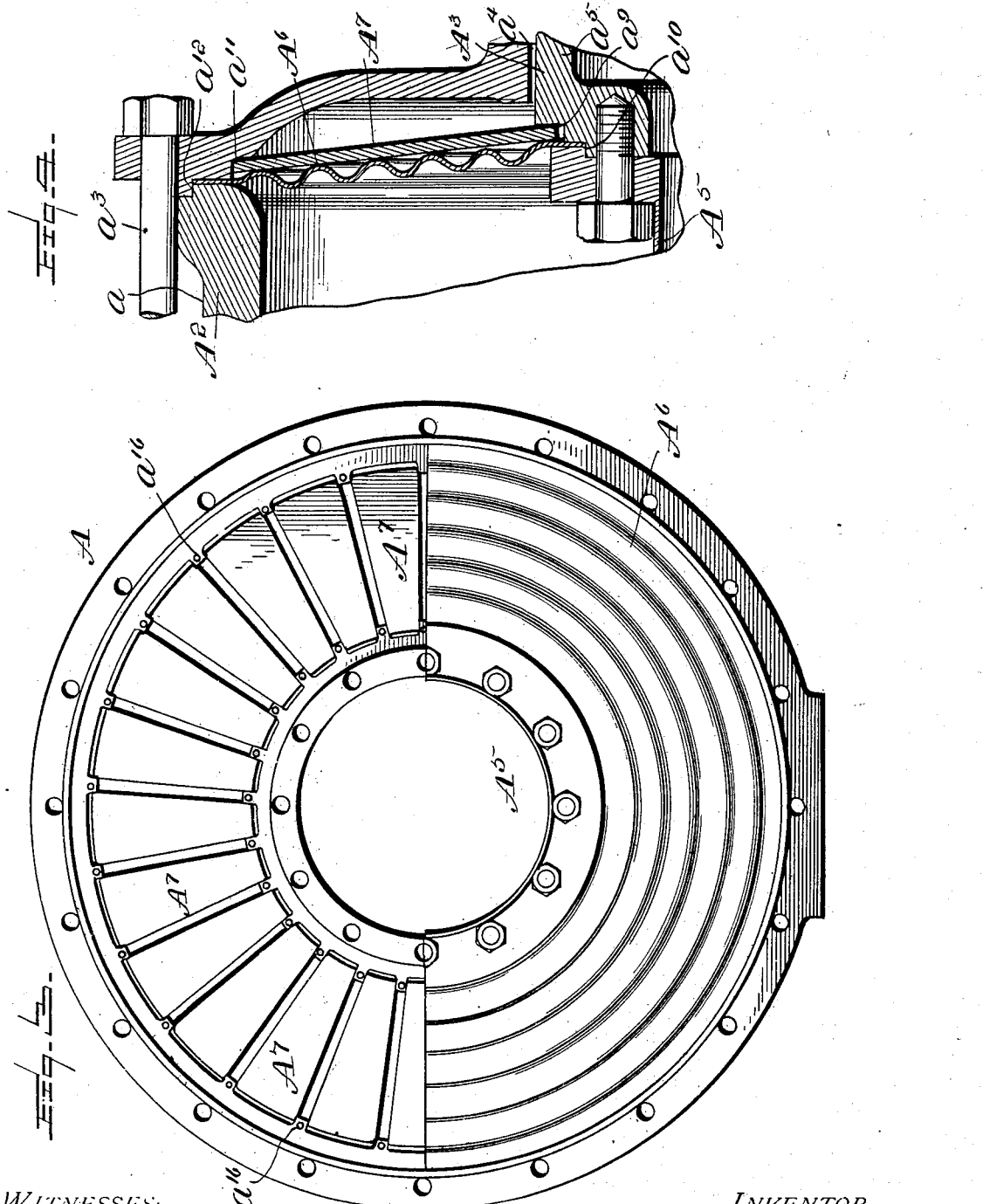

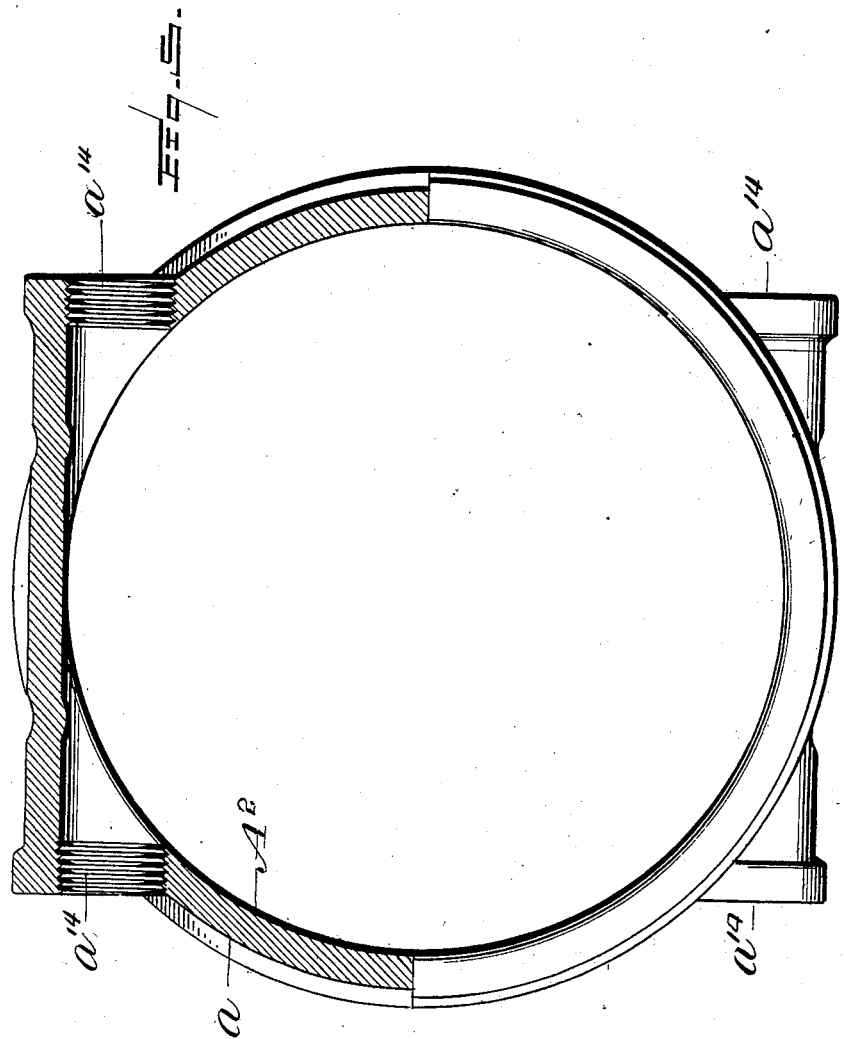

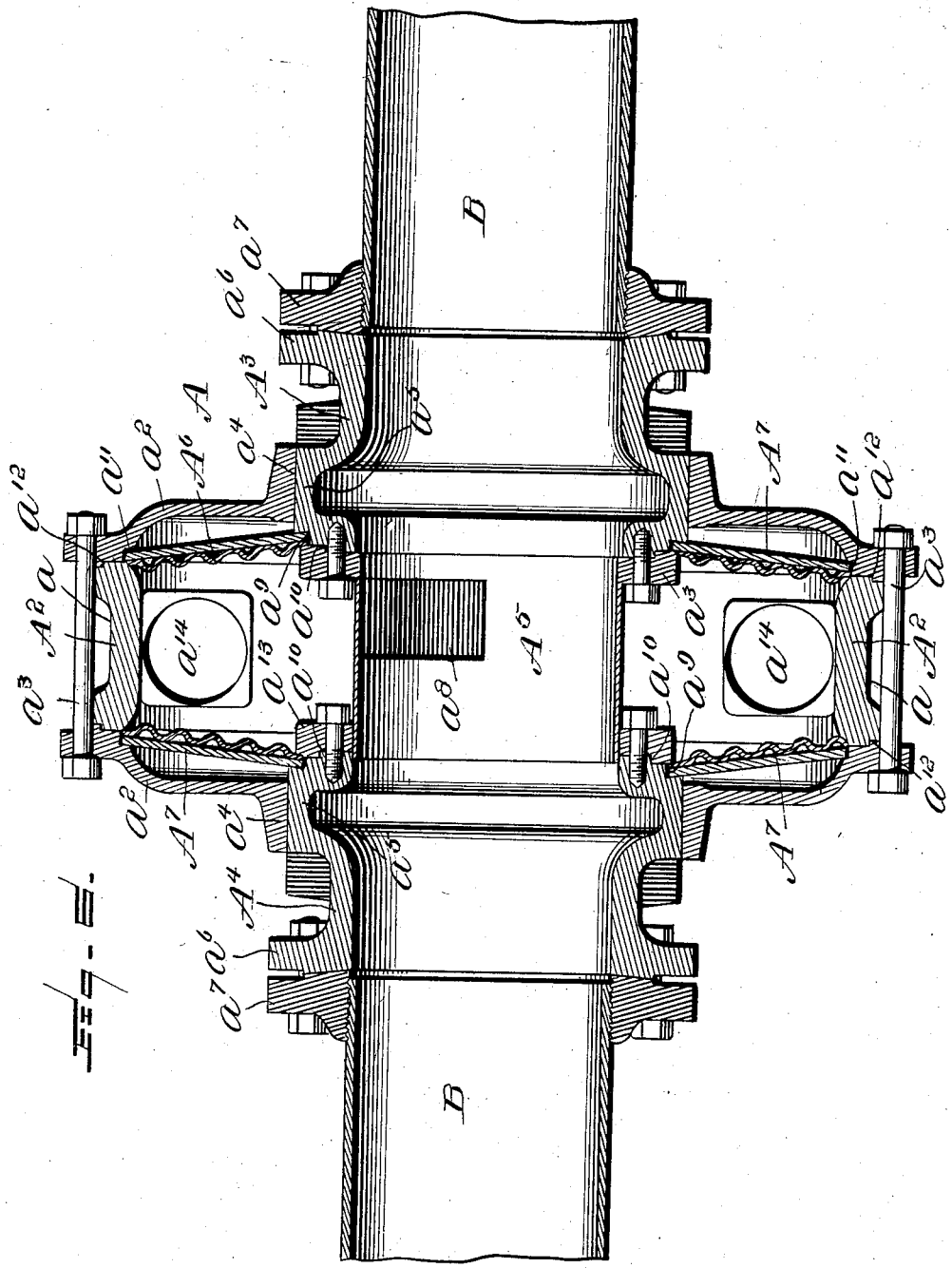

UNITED STATES PATENT OFFICE.

GAMALIEL C. ST. JOHN, OF NEW YORK, N. Y., EXECUTOR OF WALLACE C. ANDREWS, DECEASED.

VARIATOR.

SPECIFICATION forming part of Letters Patent No. 753,754, dated March 1, 1904.

Application filed July 3, 1902. Serial No. 114,323. (No model.)

*To all whom it may concern:*

Be it known that WALLACE C. ANDREWS, deceased, late a citizen of the United States, and a resident of the city of New York, in the county and State of New York, did in his lifetime invent a new and useful Improvement in Variators; and as executor of his last will and testament I do hereby declare the following to be a full, clear, and exact description of the invention, such as will enable others skilled in the art to which it appertains to make and use the same.

This invention relates to packingless variators.

The object is in underground pipe-lines used for conveying steam from a central station or point of generation to different parts of a city for heat and power and without the employment of slip-joints and stuffing-boxes requiring frequent packing to provide thorough and adequate protection against leakage caused by ruptures and breaks in the pipes due to constantly-varying strains, both lateral and longitudinal, arising from the effects of alternate expansion and contraction and the variations in the pressure and temperature of the steam passing therethrough; furthermore, to dispense with the employment of manholes at intervals along a pipe-line and to obviate the necessity of frequent tearing up of pavements for the purpose of packing the joints, resulting in serious delays and interruption of traffic, as well as the incurrence of heavy expense, and to provide efficient means for relieving a main or pipe of any water of condensation which might prove injurious in parts of the line and, if desired, run this water into another pipe to be used either for heating or for other domestic purposes or for return to feed-water heater or the boiler or boilers furnishing the steam and, finally, to furnish a satisfactory place for making service connections from a fixed point in the mains to buildings to be furnished with steam.

Briefly stated, the variator characterized by this invention comprises a case constituting one portion of the device which in use will be stationary and two necks or slips constituting the other portion of the device connected with the case in a flexible manner by diaphragm or diaphragms, preferably of copper, and composing, respectively, an inlet member and an outlet member which in use will be movable with relation to the case—that is to say, will move to and from the case under the action of various temperatures. A main or pipe is connected with the outer end of each slip, and by the arrangement of parts of the variator an uninterrupted passage is provided through the two sections of pipe.

It is to be understood that there will be one of these variators at specified distances in a pipe-line providing for expansion in both directions from fixed points a given distance away, and as the operation of each is the same the specific description hereinafter given of one variator will serve for all.

As stated, the necks or slips are adapted for movement to and from the case, and in order that there may be no rupture of the line it is essential that provision should be made to compensate for the variations in the lengths of the pipe, due to changes in the temperature, and also to preclude the possibility of a leak occurring at the point where the pipe-sections join the variators. To accomplish this result, two diaphragms are employed, which are interposed between the periphery of the necks and the inner walls of the case and are fixed with relation to the two parts—that is to say, are clamped in place in such manner between the parts of the case and the parts of the two slips as to prevent escape of steam. The diaphragms perform a function additional to that usually confined to such part in that aside from the expanding and contracting under various conditions of pressure for the sole purpose of compensating for variations in the lengths of two pieces of connected pipe they also prevent escape of steam from the interior of the variator. In conjunction with the diaphragms a plurality of radially-disposed plates are employed, being arranged in such manner as to sustain the necks or slips in diaphragms in position for effective work. These plates serve not only to reinforce the diaphragms, but also to sustain the necks in such manner as to permit them to move to and from the case, and in order that the diaphragms may not be restricted in the scope of their usefulness they are preferably corrugated, and these corrugations will yield in accordance with the various lengths assumed by the pipes.

In addition to the parts already named a thimble or guide is provided (which may be in the nature of a tube or flange) that projects inward from the inlet-slip, this thimble or guide operating to bridge the space between the inner opposed ends of the two necks or slips, and thus to prevent any water of condensation or what is known as a "slug" of water from interfering with the operation of the diaphragms. The guide projects beyond the inner terminal end of the outlet-slip at a point where the diaphragm is secured in position, so that the flow of steam and water will be carried through the necks or slips and into the main. The upper half, more or less, of this guide is provided with suitable openings, through which steam may pass into the case; but the lower half, more or less, is unperforated, so that water of condensation will be prevented from suddenly accumulating in the lower half of the case.

To remove any water of condensation that may accumulate in the pipe-line and be carried into the variator-case or to furnish steam to any building, the case on each side is provided with an outlet or with outlets, in which pipes may be tapped, if desired, to remove water or supply-steam, a pipe or pipes conveying such water or steam away to a place of use for heating or other purposes or to carry back water of condensation to the boilers whence the steam is suppled.

By arranging the diaphragms and supporting or reinforcing the plates in the manner described the slips will be free to have proper play to compensate for the different lengths of the pipe under different temperatures, and the variator as a whole will be thoroughly efficient for performing the functions for which it is designed.

Further and more specific details of construction will be hereinafter fully described and claimed.

In the accompanying drawings, forming a part of this specification, and in which like letters of reference indicate corresponding parts, there is illustrated a form of embodiment of the invention, it being understood that other forms of embodiment thereof may be employed without departing from the spirit of the same.

In the drawings, Figure 1 is a view in vertical longitudinal section, showing the variators applied along a pipe-main. Fig. 2 is a view in plan showing the method in connecting variators in line. Fig. 3 is a view showing the arrangement of reinforcing-plates in the upper half of the case, those in the lower half being shown as covered by the diaphragm. Fig. 4 is a partial sectional view showing clearly the method of securing or clamping the diaphragm and also shows the relative position of the reinforcing-plates with respect to the diaphragms and the outer portion of the case or shell. Fig. 5 is a view, partly in section, of the inner ring or annulus, showing the method of providing for service-openings or openings for the removal of the water of condensation where necessary in connection with steam-mains. Fig. 6 is a vertical longitudinal section of a double variator.

Referring to the drawings, A designates the variator comprising a case or shell $A^2$, an inlet member or neck $A^3$, and an outlet member or neck $A^4$. The case or shell $A^2$ consists of a rim or annulus $a$ and two head or cover plates $a^2$, the latter being clamped or bolted securely to the rim or annulus by bolts $a^3$. Each end or cover is provided with a central opening $a^4$ of a size to accommodate the outer portions of the two slips $A^3$ and $A^4$, each of these slips being provided with a circumferential flange $a^5$ to engage with the wall of the opening $a^4$ to guide the necks. Each neck has at its outer end a flange $a^6$, to which is bolted a companion flange $a^7$, these companion flanges being interiorly screw-threaded for the reception of the inner ends of the sections of pipe B. Bolted to the inner face of the inlet-slip is a thimble or guide $A^5$, the same comprising an annulus provided in its upper half with steam-discharge openings $a^8$. This thimble or guide projects to or past the opposing face of the outlet-slip, so that a continuous passage is formed through the variator, thus to prevent water from suddenly accumulating in large quantities in the variator-case, while the steam-discharge openings $a^8$ will permit a steady discharge of steam to take place within the interior of the variator-case, thus to keep the whole line under an equal temperature and pressure and to provide for tapping off the steam. The opposed faces of the two slips are provided with exterior incuts $a^9$ and $a^{10}$, and the heads or cover-plates $a^2$ are interiorly incut at $a^{11}$ and $a^{12}$. The thimble or guide $A^5$ and the annulus or ring $a^{13}$ are interiorly incut to correspond with the incuts $a^{10}$ on the necks or slips. The middle shell or ring $a$ is exteriorly incut to fit the incuts $a^{12}$. The incuts $a^{10}$ serve to center the annulus $a^{13}$ and the guide or thimble $A^5$ in relation to the inlet and outlet slips $A^3$ and $A^4$. The incuts $a^{12}$ serve to center the heads or covers $a^2$ in relation to the middle ring or shell $a$. The incuts $a^{12}$ and $a^{10}$ also serve to center, respectively, the exterior and interior circumferences of the diaphragms $A^6$ in relation to the shell or casing $A^2$ and the necks or slips $A^3$ and $A^4$.

The thimble $A^5$ is bolted to the neck $A^3$, and the annulus $a^{13}$ is bolted to the neck $a^4$. The covers $a^2$ are bolted through the shell $a$ by bolts $a^3$, which serve to bolt the diaphragms at their circumference between the shell and the covers, respectively. The outer circumference of the thimble or guide $A^5$ and the annulus $a^{13}$ project beyond the faces of their respectively-opposed necks or slips sufficiently to form an exterior circumferential groove. Similar interior circumferential grooves are formed when the heads or covers $a^2$ are bolted or clamped to the middle ring or shell $a$ of the case $A^2$. These grooves constitute a housing for the reinforcing-plates $A^7$. The reinforcing-plates are approximately keystone in shape and when placed in position, as shown in Fig. 3, the edges of these plates radiate from a common center and serve to strengthen the diaphragms in resisting internal pressure. It is understood that the assemblage of the reinforcing-plates $A^7$ in relation to their retaining-grooves is such that any displacement is entirely obviated, and free movement of the necks or slips $A^3$ and $A^4$ will always be permitted for the purpose desired. Between these plates $A^7$, near each end, pins $a^{16}$, Fig. 3, are held in the incuts $a^9$ and $a^{11}$ of the head-plate $a^2$ and necks $A^3$ and $A^4$ to prevent friction between the paralleling edges of the plates $A^2$.

The middle ring or shell $a$ of the case $A^2$ is provided with openings $a^{14}$ on each side, top, and bottom, these several openings being screw-threaded internally to permit a pipe being tapped therein. This is clearly shown in Fig. 5. These openings $a^{14}$ may serve for the purpose of supplying steam or other commodity for heat, power, &c., may permit the removal of water of condensation where necessary in case of steam-mains, may connect with hot-water heaters, or may lead back to boilers.

The foregoing description applies to a variator with two diaphragms, constituting a double variator; but it is understood that a variator with but one diaphragm may be constructed, as shown in Fig. 1, B constituting a single variator. This variator is identical with the double variator in one half and performs the same function. The other half of the single variator $A^8$ (which may be of one homologous casting where in use) is inclosed in such manner as to prevent any movement whatever. This cover or head $A^8$ is clamped to the cover or head $a^2$ of the variator in such manner as to hold the outer rim of the diaphragm securely, and thus performs the function of the middle shell or ring $a$ in the double variator. This head or cover $A^8$ is provided with openings $a^{15}$, which are arranged in a similar manner with regard to the center line of the steam-main and perform functions indentical with the openings $a^{14}$ of the double variator.

Where mains for conveying steam are laid underground, they are to be suitably incased in masonry, conduit, or casing of suitable construction to prevent loss of heat by radiation and to protect them from damage. At intervals along the mains where the variators occur there will be constructed a suitable box or masonry, and the cases or shells $A^2$ will at these points be anchored against movement. The variators are anchored, as shown in Fig. 2, a U-shaped bracket being bolted to longitudinal bars, which bolts pass through brackets secured to the heads $a^2$ on each side, thereby holding the casing against longitudinal movement.

When the parts of the variator are assembled for use, the slips or necks are drawn out so that the diaphragms are out of plumb, as shown, to a degree practically equivalent to one-half the full expansion the pipe will ever make under the highest degree of heat, so that when the pipe is subjected to the highest degree of heat and the pipes being extended to their fullest extent the diaphragms will then be practically in the same relative condition as before expansion took place; but the position of the diaphragms will be beyond the plumb-line practically the same distance as they were ahead of the plumb-line before expansion.

It is understood that this invention is not to be limited to a pipe-line for conveying steam, as it may be employed for conveying any fluid or gas desired.

Having thus fully described the invention, what is claimed as new, and desired to have secured by Letters Patent, is—

1. In a variator, the combination of a pipe end, a casing having an axial movement on the pipe end, a diaphragm supported between the said members and arranged to permit said axial movement, and a reinforcing member also supported between said members and thereby retained in engagement with the movable diaphragm, substantially as described.

2. In a variator, the combination of a pipe end, a casing having an axial movement on the pipe end, a diaphragm supported between said members and arranged to permit said axial movement, and reinforcing members loosely supported in said members and thereby retained in engagement with the movable diaphragm, substantially as described.

3. In a variator, the combination of a pipe end, a casing having an axial movement on the pipe end, an annular diaphragm secured at its periphery to the casing and at its inner edge to the pipe end, and arranged to permit said axial movement, and reinforcing members loosely supported in said members and thereby retained in engagement with the movable diaphragm, substantially as described.

4. In a variator, the combination of a pipe end, a casing having an axial movement on the pipe end, an annular corrugated diaphragm secured at its periphery to the casing and at its inner edge to the pipe end and arranged to permit said axial movement, and radial reinforcing members loosely socketed in said members and thereby retained in engagement with the diaphragm, substantially as described.

5. In a variator, the combination of a casing, a pair of pipe ends each having an axial movement on the casing, a diaphragm supported between each pipe end and the casing, and a reinforcing member supported between each pipe end and the casing and thereby retained in engagement with the adjacent diaphragm, substantially as described.

6. In a variator, the combination of a casing, a pair of pipe ends each having an axial movement on the casing, an annular corrugated diaphragm secured at its periphery to the casing and at its inner edge to one pipe end, radial reinforcing members loosely socketed in said support in the said members and thereby retained in engagement with the diaphragm, a second annular diaphragm secured at its periphery to the casing and at its inner edge to the other pipe end, and radial reinforcing members loosely supported in said members and thereby retained in engagement with the second diaphragm, substantially as described.

7. A variator comprising a casing, an inlet-pipe end and an outlet-pipe end supported therein for reciprocatory movement, diaphragms confined between the casing and the two pipe ends, and an apertured guard or guide carried by one of said movably-supported pipe ends and telescopically engaging the other of said pipe ends, substantially as described.

8. A variator comprising a casing, an inlet-pipe end and an outlet-pipe end supported therein for reciprocatory movement, diaphragms confined between the casing and the two pipe ends, and an apertured guard or guide carried by one of said movably-supported pipe ends and telescopically engaging the other of said pipe ends, said guard constructed with apertures along its upper portion and communicating between said diaphragms, substantially as described.

In witness whereof I affix my signature in presence of two witnesses.

GAMALIEL C. ST. JOHN,
*Executor of the estate of Wallace C. Andrews, deceased.*

Witnesses:
GEO. S. BEITH, Jr.,
ALFRED E. SMITH.